(12) United States Patent
Witzel et al.

(10) Patent No.: US 8,649,777 B2
(45) Date of Patent: Feb. 11, 2014

(54) PRESENCE SERVICE TIME ZONE INFORMATION

(75) Inventors: Andreas Witzel, Herzogenrath (DE); Joerg Christian Ewert, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 13/133,329

(22) PCT Filed: Jan. 13, 2009

(86) PCT No.: PCT/EP2009/050325
§ 371 (c)(1),
(2), (4) Date: Jul. 15, 2011

(87) PCT Pub. No.: WO2010/066472
PCT Pub. Date: Jun. 17, 2010

(65) Prior Publication Data
US 2011/0263272 A1    Oct. 27, 2011

Related U.S. Application Data

(60) Provisional application No. 61/120,645, filed on Dec. 8, 2008.

(51) Int. Cl.
*H04W 4/02*    (2009.01)
(52) U.S. Cl.
USPC ..... 455/414.1; 455/420; 455/440; 455/456.1; 455/456.3

(58) Field of Classification Search
USPC ................ 455/414.1, 420, 440, 456.1, 456.3
See application file for complete search history.

(56) References Cited

U.S. PATENT DOCUMENTS

| | | |
|---|---|---|
| 2006/0003766 A1 | 1/2006 | Parameswar et al. |
| 2006/0052113 A1 | 3/2006 | Ophir et al. |
| 2006/0252438 A1* | 11/2006 | Ansamaa et al. ............. 455/503 |
| 2007/0088839 A1 | 4/2007 | Yoakum |
| 2008/0139202 A1* | 6/2008 | Wang et al. ................ 455/432.1 |
| 2009/0181651 A1* | 7/2009 | Klassen ..................... 455/414.1 |

OTHER PUBLICATIONS

3rd Generation Partnership Project. 3GPP TS 23.141, V8.1.0 (Jun. 2008). 3rd Generation Partnership Project; Technical Specification Group Services and System Aspects; Presence Service; Architecture and functional description (Release 8), pp. 8-34. Jun. 2008.

* cited by examiner

*Primary Examiner* — Ajit Patel
*Assistant Examiner* — Julio Perez
(74) *Attorney, Agent, or Firm* — Coats & Bennett, PLLC

(57) ABSTRACT

The invention relates to a method for providing a time zone information of a mobile user entity to a presence server of a cellular network, wherein a network control node by which the mobile user entity is served, is determined. Based on the geographical position of said network control node, a time zone information is determined and transmitted to the presence server.

21 Claims, 7 Drawing Sheets

PRESENCE SERVICE TIME ZONE INFORMATION

TECHNICAL FIELD

The present invention relates to a method for providing location information of a mobile user entity to a presence server of a cellular network and to a database of a home network providing said location information to the presence server.

BACKGROUND

A presence server in a cellular network is a network entity responsible for managing presence information on behalf of a presence entity. 3GPP TS 23.141 specifies the presence service which provides the ability for the home network to manage presence information of a mobile user's entity, service or service media even while roaming. A user's presence information may be obtained through input from the user, information supplied by network entities or information by elements external to the home network. Consumers of presence information, i.e. watchers, may be internal or external to the home network and maybe end users or data processing apparatuses.

In FIG. 1 the generic reference architectural model for providing presence service is shown. A presence server 10 provided in a home network of a mobile user entity subscribing to a cellular network can receive presence information from different sources. Information about the presence of a mobile user entity may be received from a presence network agent 11 receiving information from various network nodes, such as the Mobile Switching Centre Server (MSC Server). When the information is received from the MSC server the Pc interface may reuse a CAMEL (Customized Application for Mobile Network Enhanced Logic) mechanism for information retrieval. A Pen interface can be used to forward the information to the presence server 10. Furthermore, a presence information may be provided by the user through the presence user agent 12, the presence user agent being a terminal or network located element that collects and sends user-related presence information to the presence server 10. Here the capability of the UT interface may be reused. The Peu interface may be used to forward the information to the presence server 10. Furthermore, it is possible that presence information is provided to the presence server from outside the network through the presence external agent 13 using a Px interface.

A Presentity Presence Proxy, presentity being a combination of the words presence and entity 14 is a functional entity that provides the presentity related functionality such as determining the present server associated with a presentity. A Watcher Presence Proxy describes the entity that provides watcher-related function such as authentication of watchers, a presence list server 16 being a functional entity that stores grouped lists of watched presentities and enables a watcher application to subscribe to the presence of multiple presentities using a single transaction. Additionally, the watcher applications 17 are provided.

Presentity usually refers to a human and describes availability and willingness of this human to communicate via a set of communication services.

Pep and Pen as shown in FIG. 1 may refer to RFC 3863 for support of transport of presence information under the PIDF (Presence Information Data Format) format. In addition, Pep provides mechanisms for the presence user agent to obtain information on watcher subscriptions to the presentity's presence information.

In FIG. 2 the usual Presence Server (PS) connection based presence information provisioning to the presence server is shown. The user entity publishes the presence information to the P-CSCF (Proxy Call Session Control Function). From the P-CSCF the presence information is transmitted to the serving CSCF (S-CSCF), the S-CSCF evaluating the initial filter criteria allowing to determine which watcher is allowed to obtain which kind of information. In the next step the presence information is transmitted to the presence server where a publisher authorization is carried out before an information acknowledgement is sent back to the mobile user entity.

Using the 3GPP defined Ph interface from the home location register HLR or home subscriber server HSS, it is possible that a watcher queries the state and status of a particular subscriber. However, it does not contain the location. Using the 3GPP defined Pc interface from the MSC server to the presence network agent, it is possible that the presence information contains the current location of the subscriber. However, it does require support of CAMEL Ph3 functionality also in a roaming network and creates a high network load if mobility events are reported to the presence server. On the other hand a very simple presence attribute and time zone information would be very helpful, especially for people having to travel frequently intercontinental and between various time zones. Subscribers trying to reach those business people could use the presence information to see the current country and time zone. Subscribers to the presence server trying to reach those people could use the presence information to determine in which time zone the user of the mobile user entity is presently located so that disturbing during the night or during a nonworking day such as a public holiday can be avoided.

SUMMARY

Accordingly, a need exists to provide a possibility to easily deduce in which time zone a mobile user entity.

This need is met by the features of the independent claims. In the dependent claims preferred embodiments of the invention are described.

According to a first aspect of the invention a method for providing location information of a mobile user entity to a presence server of a cellular network is provided wherein it is determined by which network control node the mobile user entity is served. Furthermore, the geographical position of said network control node is identified and a time zone in which said mobile user entity is located is determined using said geographical position. In an additional step, the time zone information is transmitted to the presence server. By deducing the time zone information as location information from the cellular network, a reliable and easy to implement way of determining the local time at the mobile user entity is obtained.

According to one embodiment it is detected whether the geographical position is within a home country of a subscriber of said mobile user entity, wherein when it is detected that the mobile user entity is not located in the time zone of the home country said time zone information is transmitted to the presence server. In this embodiment the time zone information is only provided to the presence server when the user of the mobile user entity is not in the time zone of the home network. This can help to alert a watcher to contact the subscriber of the mobile user entity at times that are also convenient to the user of the roaming mobile entity. However, it should be understood that it is also possible to always transmit the time zone information to the presence server independent on the fact whether the subscriber is within the home network or not. In this embodiment the time zone information may always be provided and available to watchers in the presence server. Furthermore, many other possibilities exist to determine the time zone information and to transmit it to the presence server. The time zone information may be provided to the presence server using any of the presence suppliers shown in FIG. 1.

One possibility to determine the geographical position of the network control node is to determine the country in which the network control node is located. Information about the country by way of example a country code representing the country in which the network control node is located, can be transmitted to the presence server together with the time zone information. The presence server may publish the time zone and/or the country in which the mobile user entity and therefore the subscriber is located. When the country is provided together with the time zone information, furthermore the information can be published whether the day is a public local holiday in the respective country etc. In this embodiment the time zone may be identified based on the information in which country the mobile user entity is located.

However, it is possible that a country extends over more than one time zone. By way of example the United States of America extend over five time zones (including Alaska) and Russia extends even over more time zones. In these cases, the identification of the country is not enough to unambiguously determine the time zone in which the user is presently located.

Accordingly, in addition to the country a region identifier may be used to determine the region within said country in which the mobile user entity is located. The time zone may then be identified based on the information in which region of the country the mobile user entity is located. As a region identifier a national destination code, transmitted from the network control node may be used.

According to one embodiment of the invention it is determined whether the country extends over more than one time zone. In the affirmative, the region identifier is used to determine the time zone and when the country only extends over one time zone the country information is enough to unambiguously determine the time zone in which the mobile user entity is located. In another embodiment, only the region identifier transmitted from the network control node may be used to determine the time zone. In this embodiment, the country does not necessarily need to be determined in addition to the region.

By comparing a country code of the network control node to a country code of the home network it can be determined whether the mobile user entity is within the home country or not. In one embodiment of the invention it can be detected whether the mobile user entity has left the home country by monitoring location or routing area update messages in the cellular network for said mobile user entity. By way of example, MAP (Mobile Application Part) update location messages referring to a subscriber from a MSC server may be monitored.

The invention furthermore provides a database of the home network providing the location information to the presence server, the data base comprising means for receiving information by which network control node the mobile user entity is served. Furthermore, means are provided for identifying a geographical position of said network control node and means for determining a time zone in which said mobile user entity is located based on the identified geographical position. Additionally, means are provided providing a time zone information to the presence server of the cellular network. In one embodiment the database may be the home location register providing and transmitting the time zone information to the presence server or a home subscriber server.

Preferably, said means for identifying a geographical position identifies an individual control node from where the mobile user entity is controlled. Said means for determining a time zone contain a data base in which the time zones of the respective control nodes are provided. Said means for determining the time zone can then use the data base to determine the time zone by deducing the time zone from the identified control node.

Said means for providing the time zone information may be adapted to furthermore provide information of the respective country and region in which the mobile user entity is located. Depending on the fact whether the country extends over more than one time zone, said means for providing the time zone information only uses the country information or uses the region identifier to determine the time zone.

Said means for receiving information by which network control node the mobile user entity is served may monitor location or routing area update messages in the network for said mobile user entity.

BRIEF DESCRIPTION OF THE DRAWINGS

The invention as well as preferred modes or views, further objectives and advantages thereof will best be understood by reference to the following detailed description of preferred embodiments when read in conjunction with the accompanying drawings, wherein.

DETAILED DESCRIPTION

Figure 1:
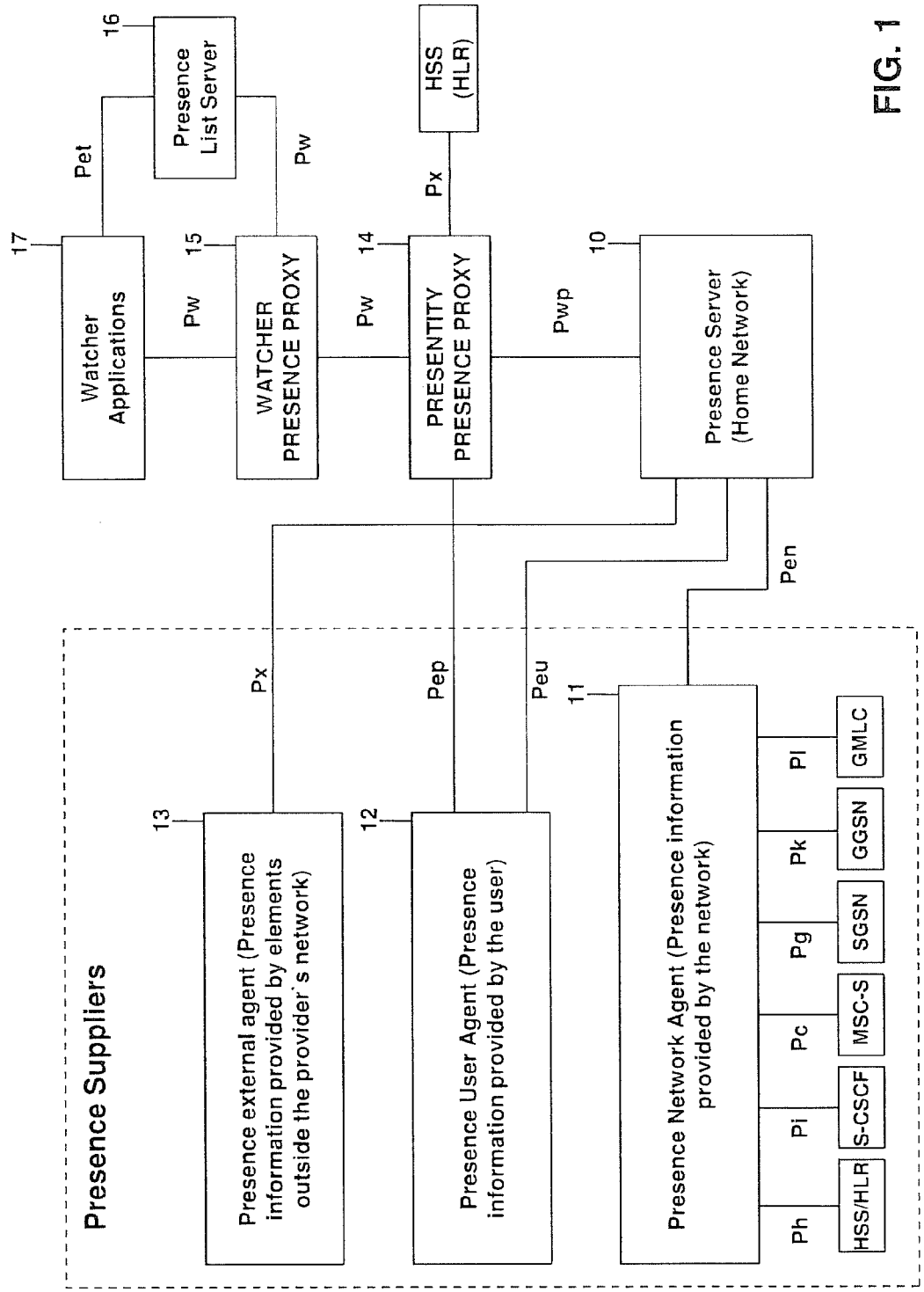
FIG. 1 is a block diagram for system providing presence information of the prior art.
Figure 2:
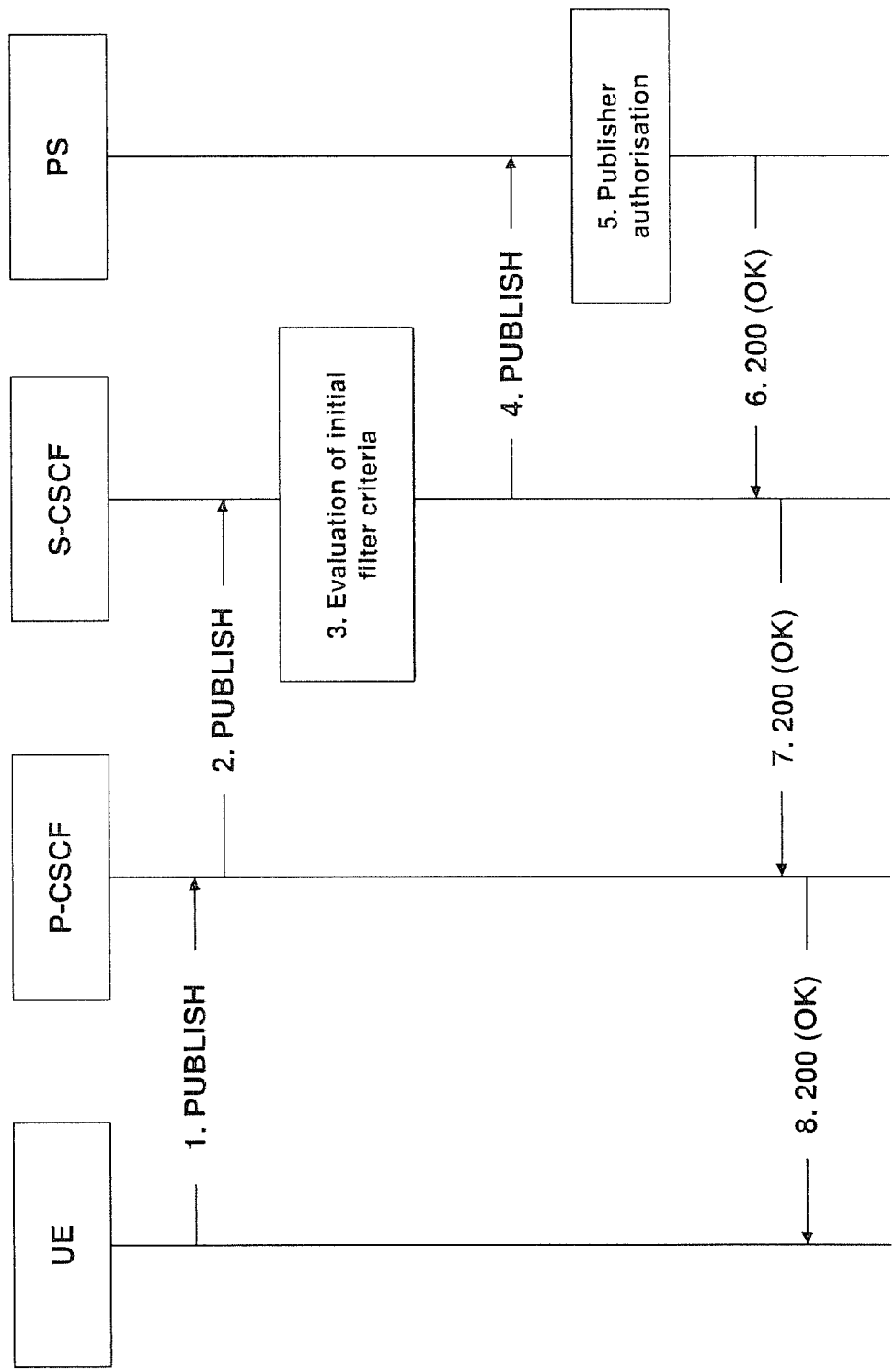
FIG. 2 is a flowchart showing how location information is provided to a presence server, as known from the prior art
Figure 3:
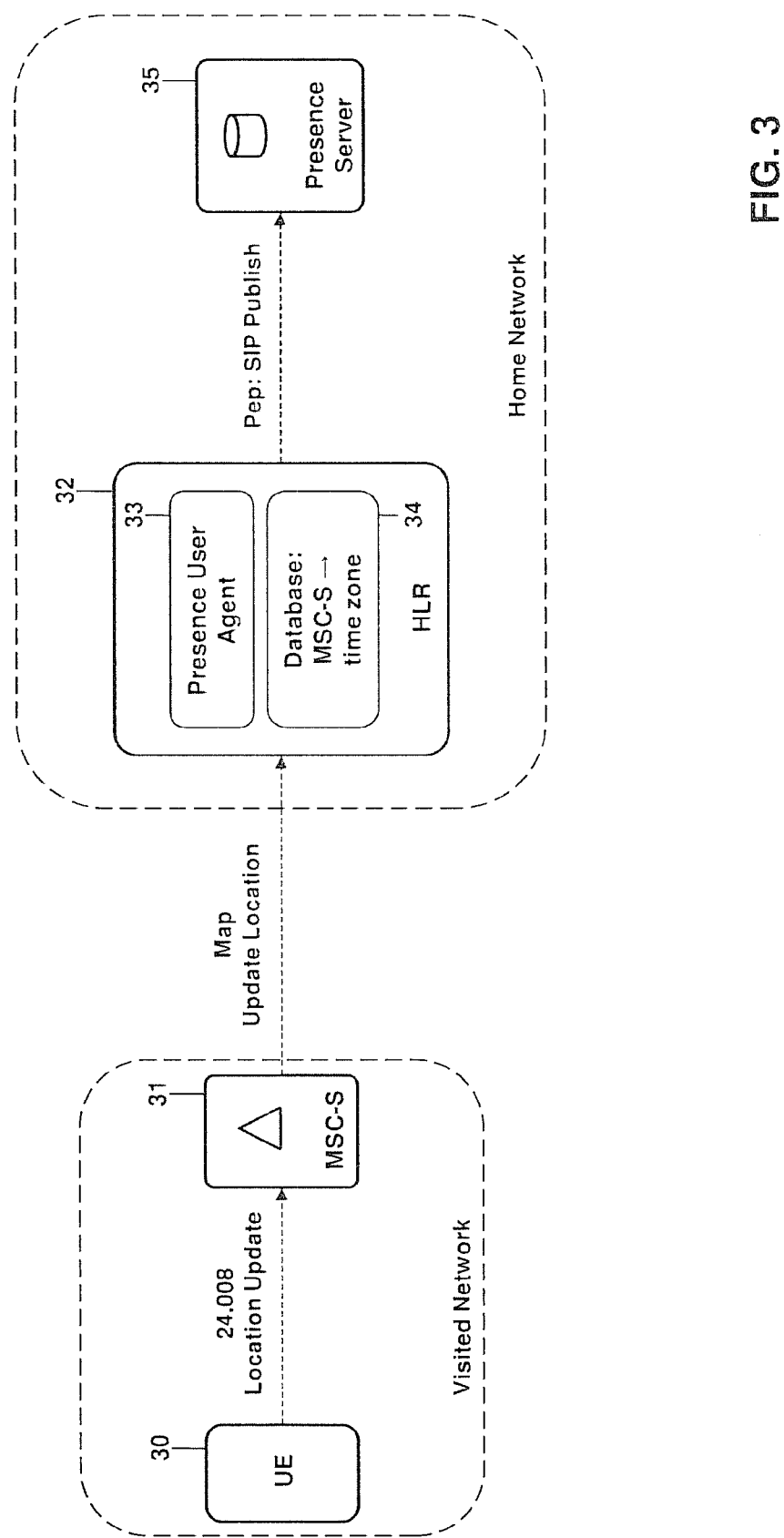
FIG. 3 shows a block diagram of a system providing the presence server with a time zone information.

In connection with FIG. 3 it is explained in more detail how the time zone information is provided to the presence server. When switched on, a mobile user entity 30 of a subscriber performs an IMSI (International Mobile Subscriber Identity) attach procedure in the serving mobile switching centre/mobile switching centre server (MSC-S). When roaming into a new mobile switching centre server area, the user entity performs a location update procedure. In both cases the serving MSC server 31 informs the respective home location register HLR 32 of the subscriber that the subscriber is now served by this MSC/MSC server. The home location register contains a presence user agent 33 collecting user-related presence information. The home location register furthermore comprises a database 34 where on the basis of the information of the MSC server the time zone can be determined. The time zone information, accompanied by a country information can then be transmitted to the presence server 35.

The HLR when receiving an update location like indication checks whether the subscriber has left his home time zone, e.g. via his home country in case there is only one time zone for the whole country. The HLR can do so by comparing the country code of the subscriber with the country code of the serving MSC server address. If both are not equal, the subscriber roams in a foreign country. As will be explained in detail further below, other solutions may be based on a routing area indication or location area indication which could be used as an alternative or in case where multiple time zones are available within a country. With the help of the database 34 and using the serving MSC as an index, the HLR may determine the time zone, the subscriber is roaming in and by that may even determine further information which might be relevant for a customer of the present service, e.g. the country the subscriber is roaming in and further information such as whether the day is a public holiday in the respective country or any other information.

Figure 5:
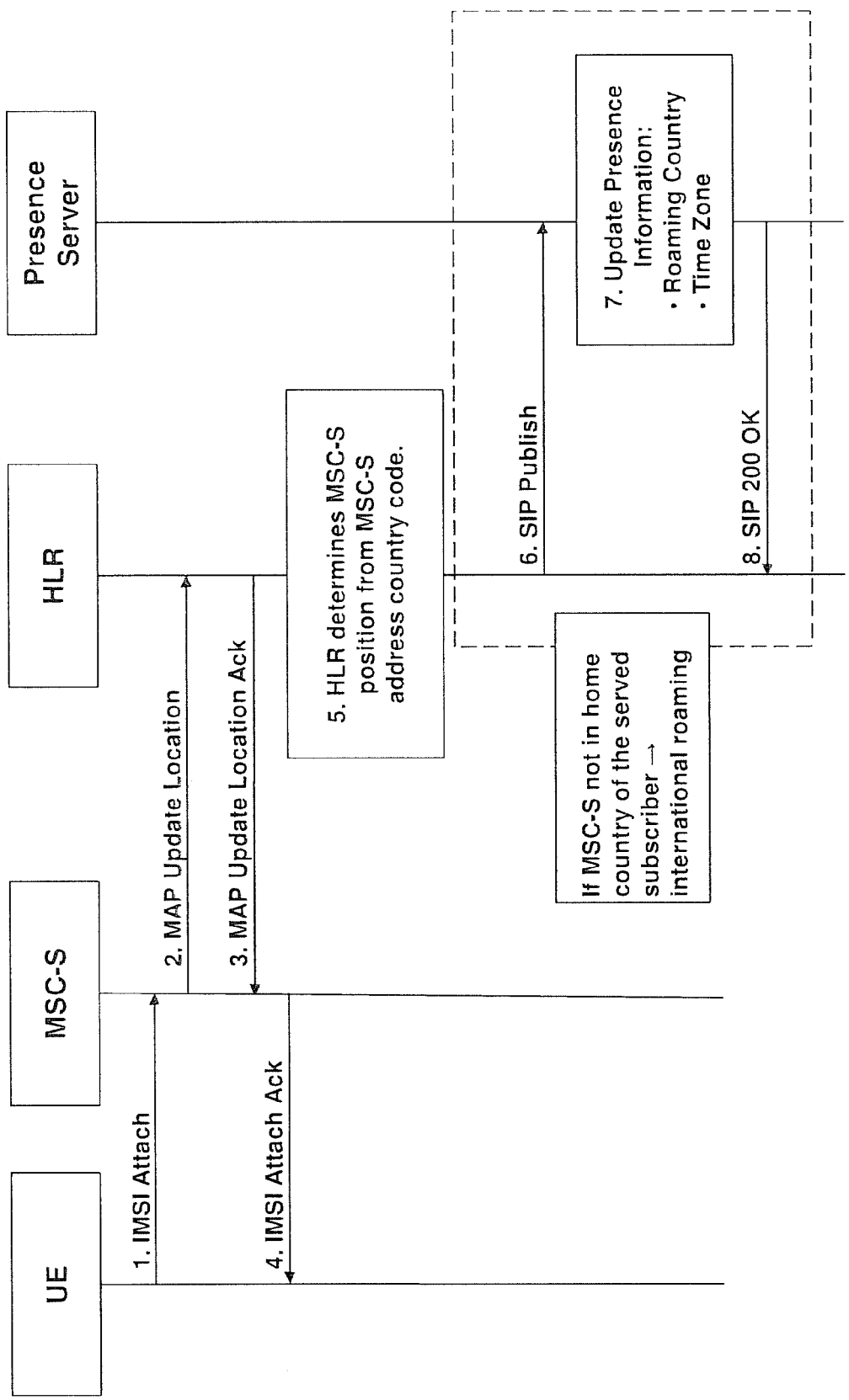
FIG. 5 shows a flowchart showing how the information of the user entity is used to determine the time zone.

The steps between the user entity and the presence server are summarized in FIG. 5. The attach message is sent to the MSC server in step 1. A MAP update location message is sent to the HLR in step 2 the HLR sending an acknowledgement to the MSC server, the latter sending the acknowledgement to the user entity (step 3 and 4). In the fifth step the HLR determines the MSC server position form the MSC server address country code. In step 6 the information of the country and the time zone are transmitted to the presence server (e.g. the HLR may use the Pep interface to publish the time zone and/or country) and any further information in a presence attribute on behalf of the subscriber. The presence server updates in step 7 the presence information by indicating the roaming country and the time zone the presence server transmitting an ok message to the HLR in step 8.

Figure 4:
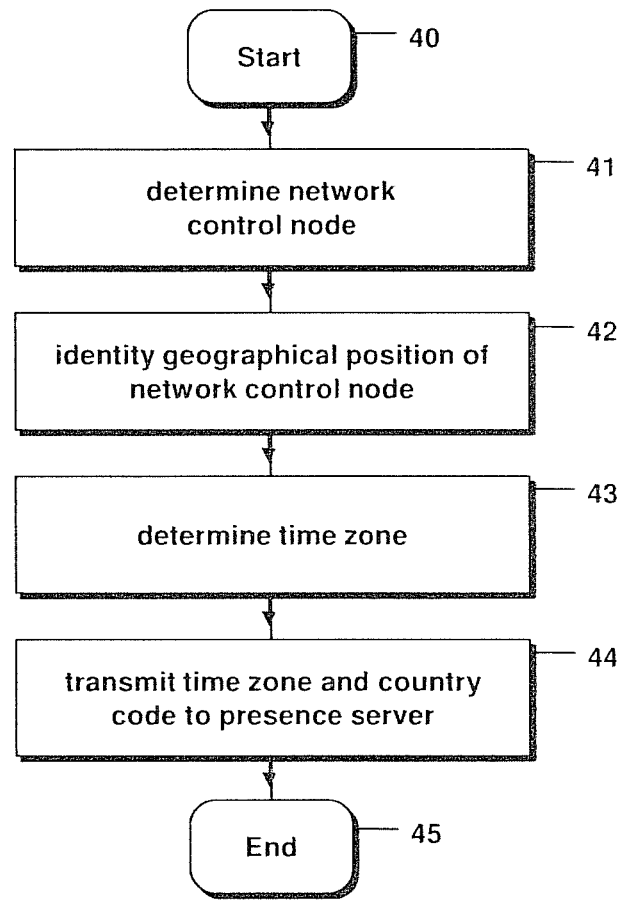
FIG. 4 shows a flowchart showing how the time zone information is determined and transmitted to the presence server.

In FIG. 4 the generalized steps needed to determined the time zone information are summarized. The process starts in step 40 and in step 41 the network control node is determined which controls the mobile user entity in the cellular network. In step 42 the geographical position of the network control node is determined. This can be done by determining the country or the region in which the network control net is provided. Based on the country or based on the region or based on the country and the region, the time zone is determined in step 43 and transmitted to the presence server in step 44, preferably together with the country code. The method ends in step 45.

Figure 6:
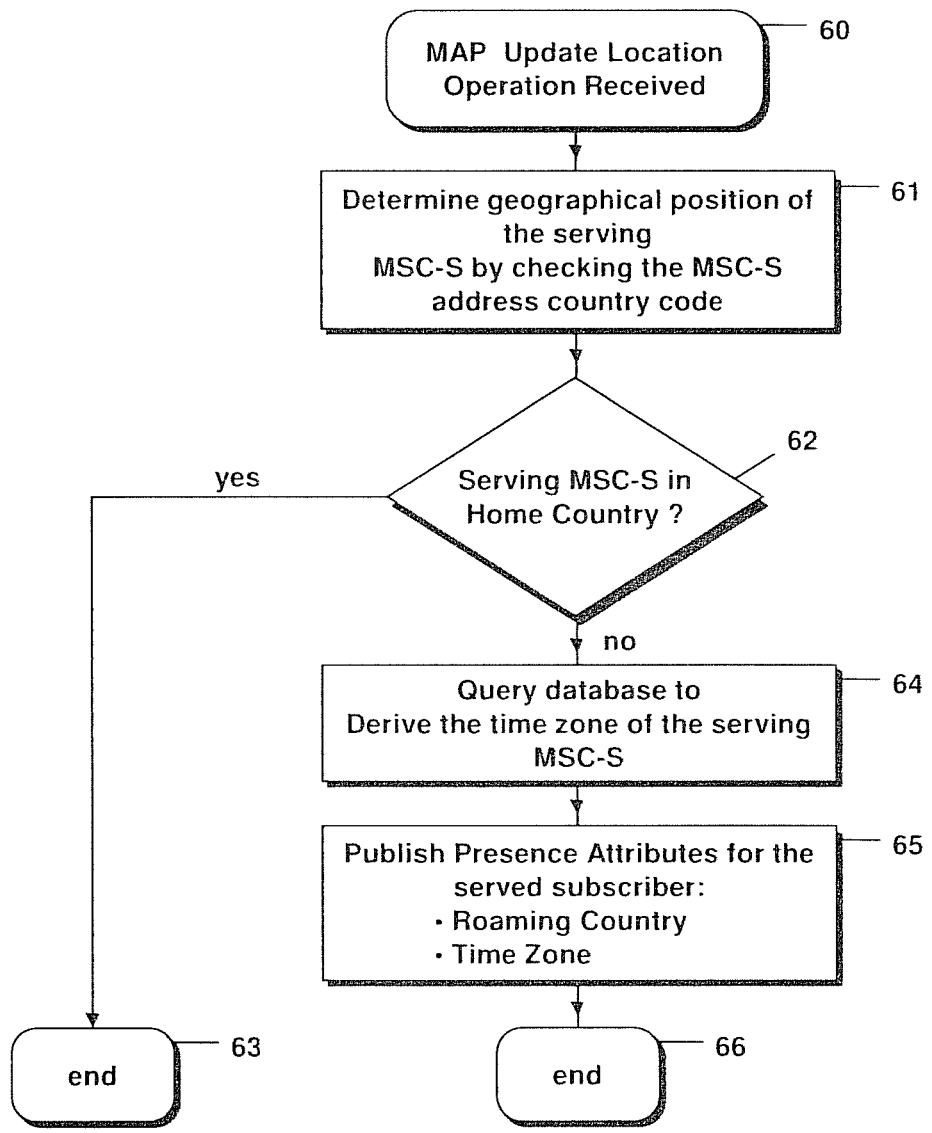
FIG. 6 shows a flowchart of another embodiment with the steps providing the time zone information depending on the fact whether the mobile user entity is provided in his/her home country.

In connection with FIG. 6 the related decision logic in a database node such as the HLR is shown. In step 60 a map update location operation is received. In the next step 61 the presence user agent determines the geographical position of the serving MSC server by checking the MSC address country code. In step 62 it is asked whether the serving MSC server is located in the home country. If this is the case, the method ends in step 63. However, if the serving MSC server is not located in the home country, the database 43 may be queried in step 64 to derive the time zone of the serving MSC server. In step 65 the presence attribute for the served subscriber such as the roaming country and the time zone are published before the method ends in step 66.

The information whether within a given country the day is a public holiday or not may be provided either by means of data stored in the HLR or maybe retrieved by the HLR or the presence server on receiving a location information such as a country code or location area or a routing area information.

It should be understood that although described in the above with reference to a roaming subscriber that the invention is not limited thereto but also encompasses that a user does not roam but shifts time zone within a country which may be the home country or a roaming country.

Figure 7:
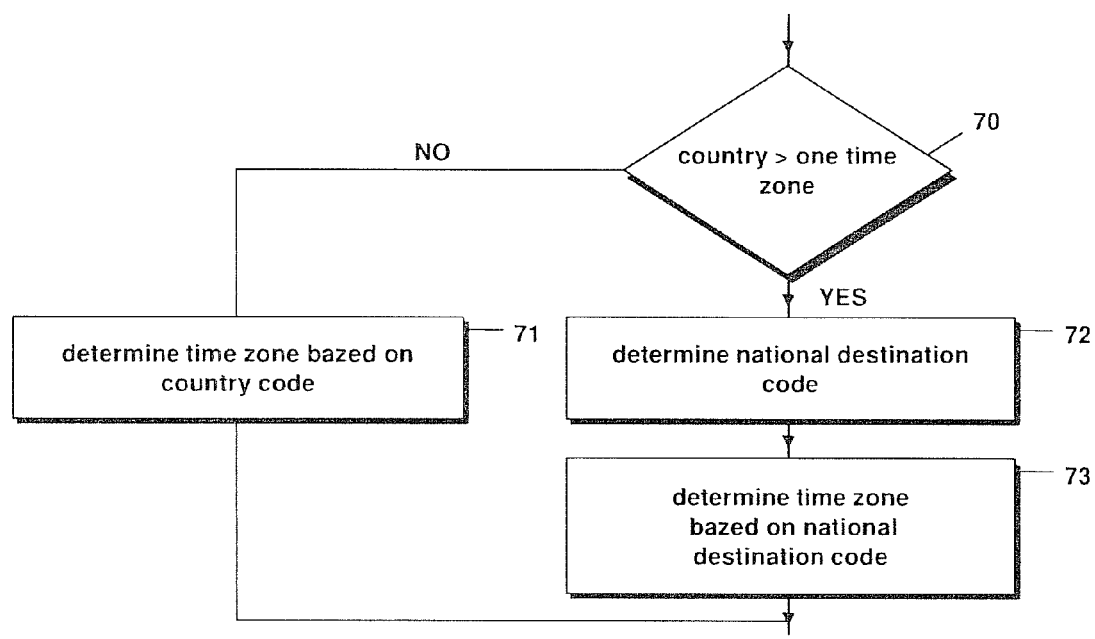
FIG. 7 shows a flowchart with a more detailed analysis of how the time zone information is obtained.

In FIG. 7 the derivation of the time zone of step 64 of FIG. 6 is shown in more detail. For the determination of the time zone it may be detected in step 70 whether the country extends over more than one time zone or not. If this is not the case, the time zone can be unambiguously determined by determining the country. In step 71 the time zone is determined using the country code of the network control node. If however, it is determined in step 70 that the country extends over more than one time zone, a national destination code may be determined in step 72. As an alternative, a location area or routing area information may be determined in step 72. Based on this more regional specific information, the time zone can then be determined in step 73.

Although the above concept is described for the MSC server, i.e., for Circuit Switched (CS) access, the invention is not limited to CS access only. In case of a Packed Switched (PS) access a Serving GPRS Support Node SGSN (GPRS, EDGE, WCDMA) may be used to perform the related mobility management. In Long Time Evolution LTE (E-UTRAN) access this function may be defined to be in the MME. In generic terms, the logical function of reporting a current location to the central data base can be used. Furthermore, the HLR as a database should only be seen as an example for a database holding the current geographical position. In an IMS environment an equivalent database could be the HSS (Home Subscriber Server) or in the IETF SIP environment, a SIP (Session Initiation Protocol) Registrar or a Location Server could serve as the respective database. In generic terms, any database offering a look-up whereto a call needs to be routed may be appropriate to serve the above purpose.

Summarizing the present invention allows for providing customers of a present service to get addition information on the time zone and/or country a subscriber is roaming in. Further information can be provided enabling the customer to choose whether it is appropriate or not to contact said subscriber.

The invention claimed is:

1. A method for providing location information of a mobile user entity to a presence server of a cellular network that comprises a core network and an access network, comprising:
   determining by which of a plurality of network control nodes in the core network of the cellular network the mobile user entity is served and controlled,
   determining an identifier of that network control node,
   determining a time zone in which said mobile user entity is located, by determining a time zone of said network control node and deducing the time zone in which the mobile user entity is located from the time zone of said network control node, wherein determining the time zone of said network control node comprises using the determined identifier of said network control node to look that time zone up in a database indicating the time zones associated with respective identifiers of the plurality of network control nodes, and
   transmitting time zone information associated with the determined time zone to the presence server.

2. The method according to claim 1, further comprising detecting whether a geographical position of said mobile user entity is within a home country of a subscriber of said mobile user entity, and wherein said determining and transmitting are performed if it is detected that the mobile user entity is not located within the home country.

3. The method according to claim 2, wherein detecting whether the geographical position is within the home country comprises comparing a country code of the network control node to a country code of the home country.

4. The method according to claim 2, wherein detecting whether the geographical position is within the home country comprises monitoring location or routing area update messages in the cellular network for said mobile user entity.

5. The method according to claim 1, wherein a geographical position of said network control node is identified by determining the country in which the network control node is located.

6. The method according to claim 5, wherein a country code associated with said country is transmitted to the presence server together with the time zone information.

7. The method according to claim 5, wherein the time zone is determined based on the country in which the mobile user entity is located.

8. The method according to claim 5, wherein the geographical position of said network control node is identified also by the region within said country in which the mobile user entity is located.

9. The method according to claim 8, wherein the time zone in which said mobile user entity is located is determined based on the country and the region in which the mobile user entity is located.

10. The method according to claim 8, further comprising determining whether the country extends over more than one time zone, and, if so, using a region identifier associated with said region to determine the time zone in which the mobile user entity is located.

11. The method according to claim 1, wherein said determining comprises determining by which of a plurality of mobile switching center servers in the core network the mobile user entity is served, and wherein said identifying comprises identifying a geographical position of that mobile switching center server serving the mobile user entity.

12. An apparatus in a cellular network that comprises a core network and an access network, wherein the apparatus comprises a database for providing location information of a mobile user entity to a presence server and is configured to:
receive information that indicates by which of a plurality of network control nodes in a core network of the cellular network the mobile user entity is served and controlled,
determine an identifier of that network control node,
determine a time zone in which said mobile user entity is located, by determining a time zone of said network control node and deducing the time zone in which the mobile user entity is located from the time zone of said network control node, wherein determining the time zone of said network control node comprises using the determined identifier of said network control node to look that time zone up in a database indicating the time zones associated with respective identifiers of the plurality of network control nodes, and
provide time zone information associated with the deduced time zone to the presence server.

13. The apparatus according to claim 12, wherein the apparatus is further configured to provide to the presence server information of the respective country and region in which the mobile user entity is located.

14. The apparatus according to claim 12, wherein the apparatus is further configured to monitor location or routing area update messages in the cellular network for said mobile user entity.

15. The apparatus according to claim 12, wherein the apparatus comprises a home location register or home subscriber server of said mobile user entity.

16. The apparatus according to claim 12, wherein the apparatus is further configured to detect whether a geographical position of said mobile user entity is within a home country of a subscriber of said mobile user entity, and is configured to determine said time zone in which said mobile user entity is located and provide said time zone information to the presence server if it is detected that the mobile user entity is not located within the home country.

17. The apparatus according to claim 16, wherein the apparatus is configured to detect whether the geographical position is within the home country by comparing a country code of the network control node to a country code of the home country.

18. The apparatus according to claim 16, wherein the apparatus is configured to detect whether the geographical position is within the home country by monitoring location or routing area update messages in the cellular network for said mobile user entity.

19. The apparatus according to claim 12, wherein the apparatus is configured to identify a geographical position of said network control node by determining the country in which the network control node is located.

20. The apparatus according to claim 19, wherein the apparatus is configured to transmit a country code associated with said country to the presence server together with the time zone information.

21. The apparatus according to claim 12, wherein said plurality of network control nodes comprises a plurality of mobile switching center servers, and wherein the network control node serving the mobile user entity is the mobile switching center serving the mobile user entity.

* * * * *

UNITED STATES PATENT AND TRADEMARK OFFICE
CERTIFICATE OF CORRECTION

| | | |
|---|---|---|
| PATENT NO. | : 8,649,777 B2 | |
| APPLICATION NO. | : 13/133329 | |
| DATED | : February 11, 2014 | |
| INVENTOR(S) | : Witzel et al. | |

It is certified that error appears in the above-identified patent and that said Letters Patent is hereby corrected as shown below:

In the Claims

Column 8, Line 48, in Claim 21, delete "center serving" and insert -- center server serving --, therefor.

Signed and Sealed this
Third Day of March, 2015

Michelle K. Lee
*Deputy Director of the United States Patent and Trademark Office*